Dec. 27, 1949     M. C. TOWNSEND     2,492,604
CLOSURE EQUIPPED STRUCTURE
Filed Jan. 19, 1946
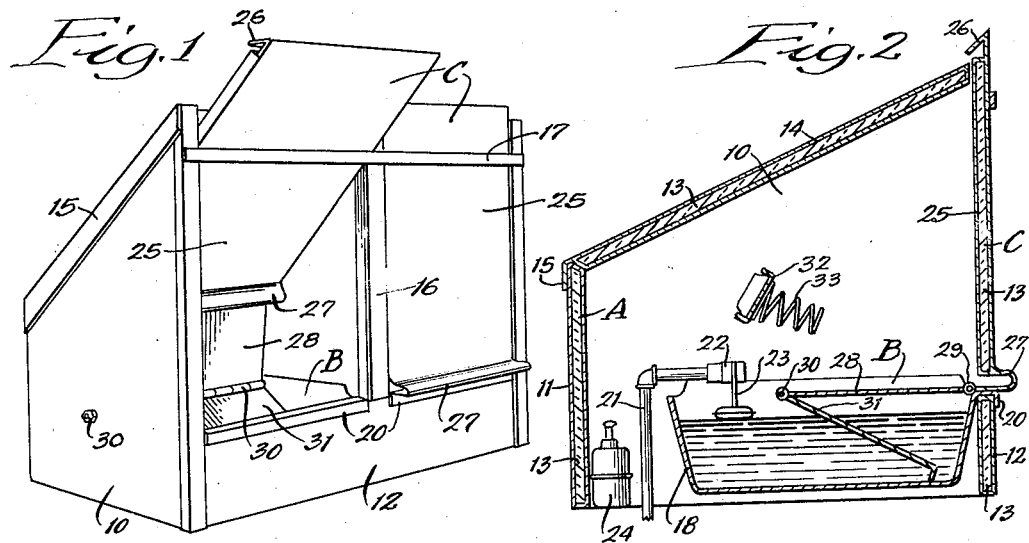
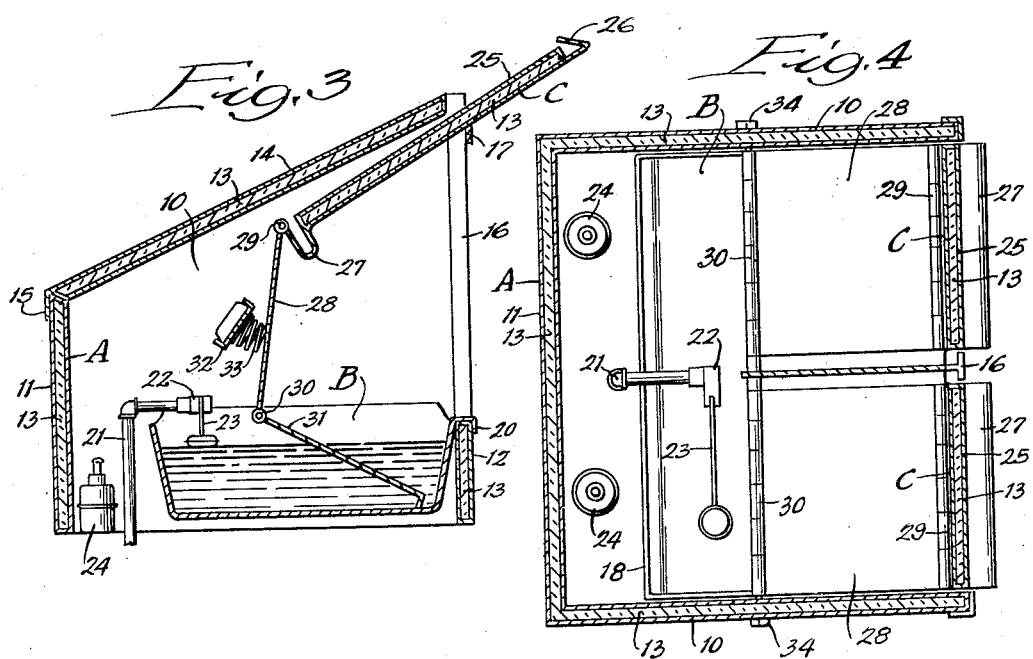
Inventor:
Maurice Clifford Townsend,
By Dawson, Brothers & Spiegelberg,
Attorneys.

Patented Dec. 27, 1949

2,492,604

UNITED STATES PATENT OFFICE 2,492,604

CLOSURE EQUIPPED STRUCTURE

Maurice Clifford Townsend, Hartford City, Ind.

Application January 19, 1946, Serial No. 642,195

5 Claims. (Cl. 119—72)

This invention relates to a closure-equipped structure suitable for a variety of uses. For the purpose of illustration, the invention is described herein in connection with a fountain or watering structure for hogs and the like.

It has been discovered that hogs and other livestock, poultry, etc., do not like ice or warm water. They prefer to drink water which is at about earth temperature. Since the drinking of an abundance of water is highly beneficial to the well being and growth of livestock and poultry, it is of great importance to provide a fountain or watering device which will maintain water as closely as possible to such desired temperatures. While insulated structures contribute towards the avoidance of ice in the winter and of excessive heat in the summer, such structures have not in themselves provided a complete solution because of the difficulty of protecting the interior of the structures from wind, water, and the surrounding air currents. In providing the hog with means of access to the interior of the structure where the watering trough or the like is maintained, such interior has also been heretofore exposed and made accessible to the surrounding air currents and to breezes which readily make the interior of the structure approximately the temperature of the surrounding air.

An object of the present invention is to provide a structure overcoming the above-mentioned disadvantages, while at the same time providing a structure which will prevent the formation of ice and which will keep the temperature of the water in the summertime more nearly the earth temperature. A further object is to provide a structure equipped with new closure means whereby the hog, etc., may have ready access to the watering trough, etc., while at the same time providing a fairly tight structure in which wind and air currents are largely excluded. A further object is to provide a structure in which the closure may be readily manipulated by the hog with its nose so as to open the cabinet, while at the same time providing means for cushioning the door when it is allowed to fall down to its original closed position. A still further object is to provide means for providing a constant supply of clean water at a proper temperature throughout the year with no effort on the part of the farmer, while at the same time enabling the hog, etc., to have ready access to the water at all times. Other specific objects and advantages will appear as the specification proceeds.

The invention is illustrated, in a preferred embodiment, by the accompanying drawing, in which:

Figure 1 is a perspective view of a structure embodying my invention, one of the doors being raised to open position; Fig. 2, a transverse sectional view of the structure shown in Fig. 1, the door being in closed position; Fig. 3, a view similar to Fig. 2 but showing the door in raised position; and Fig. 4, a plan sectional view.

In the illustration given, A designates a casing; B designates a watering trough; and C designates a door or closure structure.

The casing A may be of any suitable structure. In the illustration given, the structure comprises side walls 10, rear walls 11, and a front base wall 12. Each of the walls preferably consists of sheet metal with insulation 13 in between the sheet metal liners. The side walls 10 are preferably inclined from the rear upwardly, as shown more clearly in Figs. 1, 2 and 3. A roof structure 14, formed preferably as the walls 10, 11 and 12 are formed, is removably mounted upon the walls 10 and 11 and may be provided with overlapping flanges 15 which lock the roof in position about such walls.

The casing thus described may provide a single compartment structure or a double compartment structure, as illustrated. If a double compartment structure is employed, a partition may be set up between the compartments so as to make them separate, if desired.

The casing, as described, leaves an open front above the base wall 12 and the roof portion. Since two doors are employed in the structure illustrated, I provide at the front a T-shaped dividing bar 16. Also, spaced a short distance from the top of the roof 14, I provide a longitudinal bar member 17 which serves as a door guide, as illustrated best in Figs. 1 and 3.

The watering trough B may be of any suitable structure. In the illustration given, the trough 18 is supported by the pivot shaft 30 and is provided at its forward end with a flange 20 resting upon the base wall 12. By this means, the tank or trough 18 is supported above the ground and the warmed air within the interior is free to circulate about the tank. Water is supplied to the tank or trough B through the line 21 which is equipped with an outlet 22. The outlet 22 is controlled by a valve operated by the float member 23. Heater members 24 are supported behind the trough B and may be of any suitable type or construction. For example, an ordinary oil burner or wick-equipped oil lamp may be used. If desired, an electric lamp structure may be used for the purpose.

The closure structure C preferably comprises a segmental structure having a horizontal door portion and a vertical door portion. The vertical door portion 25 is preferably formed in the same manner as the side walls 10, with metal sheeting and insulation 13 therebetween. The section 25 preferably extends upwardly in close relation with the top 14 so as to form a wind-tight seal therewith, and a portion of section 25 may be extended farther above to provide a further windbreak and handle projection for the door. A continuation of the outside wall of structure C forms a spring member 27 which extends forwardly and then is looped rearwardly to provide a shock-absorbing or cushioning member for the bottom of the door. At the same time, the forwardly extending portion of the member 27 provides a projection spaced above the ground and adapted to be engaged by the nose of the hog, etc., to facilitate the raising of the door. The member 27 extends rearwardly and pivotally engages a horizontal door member 28 at 29. A pivot shaft 30 extends through the casing, longitudinally thereof, and provides a pivot support for the horizontal door section 28 and also for a protection board member 31 which extends downwardly and forwardly within the trough B, as shown more clearly in Figs. 2 and 3. The board 31 protects the float and valve structure from a hog drinking in the trough, and also prevents the hog from rooting in the trough and stirring up any sediment in the bottom of the trough.

Extending longitudinally of the structure is a spring-supporting bar member 32 which carries a coil spring 33. The spring 33 is compressed slightly when the door is swung past center to open position, as illustrated in Fig. 3, and serves the function of pushing the door forwardly sufficiently after it is released by the hog, so that it will travel over center and fall back under its own weight to the position shown in Fig. 2.

In the operation of the structure, water flows through the line 21 to fill the trough B and is maintained therein at the desired level by the float valve structure 23. In the extreme cold weather, heat is supplied by the heater device or devices behind the tank B and warm air circulates not only upwardly but around the bottom and sides of the trough B. In the closed structure illustrated, it is found that a very small amount of heat thus supplied prevents the formation of ice on the water.

When the hog wishes to drink, he engages the projecting member 27 with his nose and raises the door C to the position shown in Fig. 1. It will be noted that the raising operation is accomplished with a minimum of exposure to the air so that the interior of the chamber is still sheltered as the hog extends has head and shoulders into the forepart of the chamber and drinks from the trough B. The inward movement of the door C moves the horizontal member 28 to the vertical position shown in Fig. 3 and where it compresses the spring 33. Upon release of the door, the spring 33 moves the vertical member 28 past center toward the front of the structure, and the entire door swings readily to the position shown in Fig. 2. In the latter operation, the projecting spring structure 27 serves as a cushion or shock-absorber for the door, thus preventing injury to it and reducing the shock to the parts. In the latter position, the insulated door portion 25 co-operates with the base portion 12 in providing an insulated front for the structure. At the same time, the door portion 25 forms a close seal with the roof portion 14 and the side wall portions and, further, with the central partition member 16 so that the chamber within is sheltered from wind and air currents. Thus, it is possible to maintain through severely cold weather and severely hot weather, a chamber in the interior of the casing which has a temperature differing substantially from that prevailing outside the structure.

While I have described the invention in connection with a watering trough, it will be understood that the structure, together with its closure arrangement, may be used for feeding animals and for a variety of other uses.

With the fountain structure described, I find that a constant flow of clean water from either a pressure system or gravity tank system can be obtained regardless of weather, while at the same time maintaining the temperature within the tank fairly close to earth temperature. Much less heat is required to heat the air around the trough with the insulated cabinet structure described than would be required to heat the water itself; in mild freezing weather, no heat whatever is required. The cabinet is tightly closed when the hog is not drinking while at the same time the insulated door opens easily and completely when the hog lifts the projecting portion 27 with his nose.

While in the foregoing description, I have set forth the invention in considerable detail as illustrating one embodiment in which it may be employed, it will be understood that such details may be modified widely by those skilled in the art without departing from the spirit of my invention.

I claim:

1. In a casing provided with an open side and with an open guide slot at the upper end of the casing, a closure for said opening consisting of a vertical door portion slidably mounted in said slot and equipped at its bottom with a U-shaped strip resting upon the lower portion of said casing, a normally horizontal closure portion pivotally connected at its outer end to said U-shaped strip, and stationary means within said casing for pivotally supporting the inner end of said horizontal closure portion.

2. In a casing provided with a chamber and having its front side provided with an opening and with a guide slot at the upper end of the opening, a closure consisting of a normally vertical door slidably mounted in said guide slot and adapted normally to close said opening, a normally horizontal closure portion pivotally connected at its outer end to the bottom portion of said door, and a downwardly and outwardly inclined partition wall within said casing having its upper rear end portion pivotally connected to the inner end of said horizontal closure portion whereby when said vertical door portion is pressed inwardly said door is projected upwardly through said slot and tilted outwardly therefrom and said normally horizontal closure portion is raised to a generally vertical position.

3. In a water trough cabinet provided with an opening in its front side and with a guide slot above said opening and provided also with a water trough having a downwardly and forwardly inclined partition wall therein, a closure consisting of a normally vertical door slidably mounted in said guide slot, and a normally horizontal closure portion pivotally mounted at its inner end to the top of said partition wall and at its outer end to the lower portion of said door.

4. In a water trough cabinet provided with an opening in its front side and with a guide slot above said opening and provided also with a water trough having a downwardly and forwardly inclined partition wall therein, a closure consisting of a normally vertical door slidably mounted in said guide slot, and a normally horizontal closure portion pivotally mounted at its inner end to the top of said partition wall and at its outer end to the lower portion of said door, said door having its lower portion turned outwardly and then rearwardly to form a U-shaped projection.

5. In a water trough cabinet having its front side provided with an opening and a guide slot in the upper end of said cabinet above said opening and having also a water trough provided with a board extending across and inclined downwardly and forwardly, a closure consisting of a normally vertical door slidably mounted in said guide slot, a normally horizontal portion having its inner end hinged to the top portion of said board and its forward end hinged to the lower portion of said door, and spring means adapted to engage said horizontal closure portion when the same is raised and to urge the same forwardly, said door when pushed inwardly being guided for upward movement to project the upper portion of the door above the cabinet and to move such normally horizontal closure portion to a generally vertical position.

MAURICE CLIFFORD TOWNSEND.

REFERENCES CITED

The following references are of record in the file of this patent:

UNITED STATES PATENTS

| Number | Name | Date |
| --- | --- | --- |
| 499,656 | Clement | June 13, 1893 |
| 699,415 | Jacobs | Mar. 5, 1901 |
| 787,053 | Solomon | Apr. 11, 1905 |
| 965,940 | Ritter | Aug. 2, 1910 |
| 1,062,792 | Nelson | May 27, 1913 |
| 1,270,731 | Healy | June 25, 1918 |
| 1,312,350 | Paulson | Aug. 5, 1919 |
| 1,342,851 | Landis | June 8, 1920 |
| 1,392,513 | McCollough | Oct. 4, 1921 |
| 1,587,551 | Peterson | June 8, 1926 |
| 1,963,089 | Henderson | June 19, 1934 |
| 2,373,858 | Solyst | Apr. 17, 1945 |

FOREIGN PATENTS

| Number | Country | Date |
| --- | --- | --- |
| 47,920 | Austria | May 26, 1911 |